US006918331B2

(12) United States Patent
Okouchi

(10) Patent No.: US 6,918,331 B2
(45) Date of Patent: Jul. 19, 2005

(54) LIGHTED CUTTING TOOLS

(75) Inventor: Katsumi Okouchi, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/835,495

(22) Filed: Apr. 17, 2001

(65) Prior Publication Data
US 2001/0029819 A1 Oct. 18, 2001

(30) Foreign Application Priority Data
Apr. 18, 2000 (JP) .......................... 2000-116958

(51) Int. Cl.$^7$ .............................. B26D 7/00; B27B 9/00; B23D 47/00
(52) U.S. Cl. ................. 83/520; 83/473; 83/522.15; 83/522.17; 30/376; 30/391; 362/119
(58) Field of Search ................ 83/520, 521, 522.19, 83/522.15, 522.16, 522.17, 522.18, 522.26, 471.2, 471.3, 477.1; 30/376, 388, 390, 391, 123; 362/89, 310, 311, 365, 368, 370, 382, 119, 110

(56) References Cited

U.S. PATENT DOCUMENTS

| | | | | |
|---|---|---|---|---|
| 2,440,950 A | * | 5/1948 | Hill .............................. | 362/89 |
| 2,488,947 A | * | 11/1949 | Vavrik .......................... | 30/376 |
| 2,517,882 A | * | 8/1950 | Johnson ........................ | 173/46 |
| 3,104,688 A | * | 9/1963 | Bretthauer .................... | 362/89 |
| RE27,565 E | * | 1/1973 | Botefuhr .................... | 83/471.3 |
| 3,919,541 A | | 11/1975 | Chao | |
| 3,977,278 A | | 8/1976 | Jackson | |
| 4,257,297 A | * | 3/1981 | Nidbella ...................... | 30/376 |
| 4,555,849 A | * | 12/1985 | Ando et al. .................. | 30/388 |
| 5,129,300 A | * | 7/1992 | Kawakami .................... | 83/814 |
| 5,169,225 A | | 12/1992 | Palm | |
| 5,285,708 A | | 2/1994 | Bosten | |
| 5,375,495 A | * | 12/1994 | Bosten et al. ............... | 83/471.3 |
| 5,461,790 A | * | 10/1995 | Olstowski .................... | 30/391 |
| 5,473,519 A | | 12/1995 | McCallops | |
| 5,530,632 A | * | 6/1996 | Shikano et al. ............... | 83/520 |
| 5,634,711 A | | 6/1997 | Kennedy | |
| 5,699,705 A | * | 12/1997 | Sibbet .......................... | 83/13 |
| 5,862,727 A | * | 1/1999 | Kelly ............................ | 83/13 |
| 5,996,460 A | * | 12/1999 | Waite .......................... | 83/520 |
| 6,035,757 A | * | 3/2000 | Caluori et al. ............... | 83/520 |
| 9,570,035 | | 5/2000 | Shibata | |
| 6,175,196 B1 | | 1/2001 | Ragner | |
| 6,318,874 B1 | | 11/2001 | Matsunaga | |
| 6,494,590 B1 | | 12/2002 | Paganini et al. | |
| 6,497,168 B1 | * | 12/2002 | Levine ........................ | 83/520 |

FOREIGN PATENT DOCUMENTS

| | | |
|---|---|---|
| DE | 2529668 | 1/1977 |
| DE | 3101363 | 12/1981 |
| DE | 8521614 | 2/1986 |
| DE | 8521614.3 | 2/1986 |
| DE | 3831344 | 3/1990 |
| DE | 9010716 | 10/1990 |
| DE | 29709437 | 10/1997 |
| EP | 0073693 | 3/1983 |
| FR | 2523891 | 9/1983 |
| GB | 2305128 | 4/1997 |
| JP | 6098602 | 7/1985 |
| JP | 2512328 | 8/1991 |
| JP | 11170203 | 6/1999 |
| WO | 99/02310 | 1/1999 |

OTHER PUBLICATIONS

Japanese catalog published Apr. 1988 by Hitachi Koki Kabushiki Kaisha.

* cited by examiner

Primary Examiner—Boyer D. Ashley
(74) Attorney, Agent, or Firm—Dennison, Schultz, Dougherty & MacDonald

(57) ABSTRACT

A cutting tool includes a saw blade and a blade case adapted to cover the saw blade. A light may have a light for illuminating a portion of a workpiece that will be cut by the saw blade during a cutting operation. The light may be mounted within the blade case, so that the light is laterally displaced from the saw blade. A mounting device may be utilized to receive the light and the mounting device may be disposed within the blade case.

5 Claims, 3 Drawing Sheets

LIGHTED CUTTING TOOLS

BACKGROUND OF THE INVENTION

1. Field of the Invention

The present invention relates to cutting tools, and in particular to cutting tools having lights that serve to illuminate a portion of a workpiece that will be cut during a cutting operation.

2. Description of the Related Art

Japanese Laid-Open Utility Model Publication No. 60-98602 teaches a portable circular saw that includes a lighting device. The lighting device includes an incandescent light bulb that is disposed on the outer side of a blade case. The blade case serves to partially cover a circular saw blade and has a transparent window that is formed adjacent to the light bulb. Thus, a portion of a workpiece that will be cut can be illuminated by the light from the light bulb through the transparent window and through the inner space of the blade case.

However, the transparent window is disposed on a surface that is tangential to the saw blade. Therefore, the transparent window directly opposes the circumferential edge of the saw blade and cutting chips that fly off from the cut portion during the cutting operation will adhere to the transparent window. As a result, visibility through the window may be obscured and the illuminating effect of the light may be considerably degraded.

Japanese Laid-Open Patent Publication No. 11-170203 teaches a portable circular saw that includes a light mounted on a motor housing. The motor housing is joined to one side of a blade case and has a motor disposed therein. Thus, the light is disposed outward of the blade case. Further, the light is directed perpendicular to the cutting line instead of in parallel with the cutting line. Accordingly, although the light may be positioned away from the stream of the cutting chips from the cut portion, the cutting line cannot be effectively illuminated.

SUMMARY OF THE INVENTION

It is, accordingly, one object of the present teachings to provide improved cutting tools that can effectively illuminate a portion of a workpiece that is being cut during a cutting operation.

According one aspect of the present teachings, cutting tools having improved illumination characteristics are taught that can also prevent or substantially reduce the amount of cutting chips that may scatter and adhere to a light during a cutting operation. For example, cutting tools are taught that have a light mounted within the blade case in a position that is laterally displaced from a saw blade. Preferably, the light is directed along a line that is substantially parallel to the saw blade and the cutting line of the workpiece. The light may be optionally mounted on the blade case by means of a mounting device that is disposed within the blade case, so that the light can be disposed within the blade case.

During the cutting operation, the saw blade rotates and the cutting chips generally fly off from the cut portion in a direction that is tangential to the edge of the saw blade. Because the light is disposed laterally from the saw blade, the substantial volume of the cutting chips do not reach the light. In addition, by disposing the light within the blade case, the mounting position of the light can be chosen such that the light is close to the cutting line. Therefore, the light can effectively illuminate the cutting line.

In another aspect of the present teachings, foreign materials (including scattered cutting chips) preferably do not detrimentally affect the lighting characteristics and thus, the light can effectively illuminate the cut portion. For example, a cover may be provided to cover and shield the light from the cutting chips. However, the cover preferably does not interfere with the light directed toward the cut portion.

In another aspect of the present teachings, the light can be cooled using a cooling device, such as a fan. As a result, the light can be reliably prevented from overheating. Preferably, cooling air for cooling a motor that drives the saw blade may be conducted to a position around the light. Thus, a single fan may be provided, although a plurality of fans naturally may be utilized to cool the motor and the light.

In another aspect of the present teachings, a power supply circuit is provided to supply power to the light. In one embodiment of the present teachings, the power supply circuit may include a first coupling that may be disposed on the side of the cutting tool that includes the motor. A second coupling may be disposed on the side of the cutting tool that includes the saw blade and light. Preferably, the motor side part and the light side part can be easily connected. For example, the coupling may be adapted to connect the motor side part and the light side part after the blade case has been joined to a motor housing that accommodates the motor. In addition or in the alternative, the coupling may be adapted to connect the motor side part and the light side part at the same time that the blade case is joined to the motor housing. Preferably, the motor is an electric motor and the power supply circuit also supplies power to the electric motor.

In another aspect of the present teachings, the cutting tool has a balanced weight distribution to facilitate transportation of the tool. In one embodiment, the positions of the elements of the power supply circuit, which may included a motor and a transformer, may be chosen such that the tool is horizontally balanced. Thus, when the cutting tool is held by a handle, a base of the cutting tool preferably extends substantially horizontally and the weight of the cutting tool is evenly distributed.

In another aspect of the present teachings, the operator can easily turn on the light using a light switch. In another embodiment, the light switch and a power switch for the motor are mounted on a handle and are positioned adjacent to each other. Therefore, the operator can operate either the lighting switch and/or the power switch while holding the handle.

Preferably, the light is laterally displaced relative to a substantially flat portion of the cutting blade. If the cutting blade is a rotating circular blade, the light is preferably laterally displaced along the rotational axis of the circular blade. Moreover, the light is preferably disposed within an imaginary cylinder formed by extending the edge of the circular blade. If the cutting blade is a jig saw blade or other blade that operates by reciprocating motion, the light is preferably disposed adjacent to the flat portion of the blade. Generally speaking, the light is disposed so as to substantially avoid the stream of cutting chips that will fly off the workpiece when it is being cut by the saw blade. Further, the direction of the light is preferably substantially parallel to the substantially flat side of the saw blade and thus, the cutting line of the workpiece.

These teachings may be used together or separately to make cutting tools of the present teachings. In addition, other objects, features and advantages of the present invention will be readily understood after reading the following detailed description together with the accompanying drawings and the claims.

DETAILED DESCRIPTION OF THE INVENTION

Figure 1:
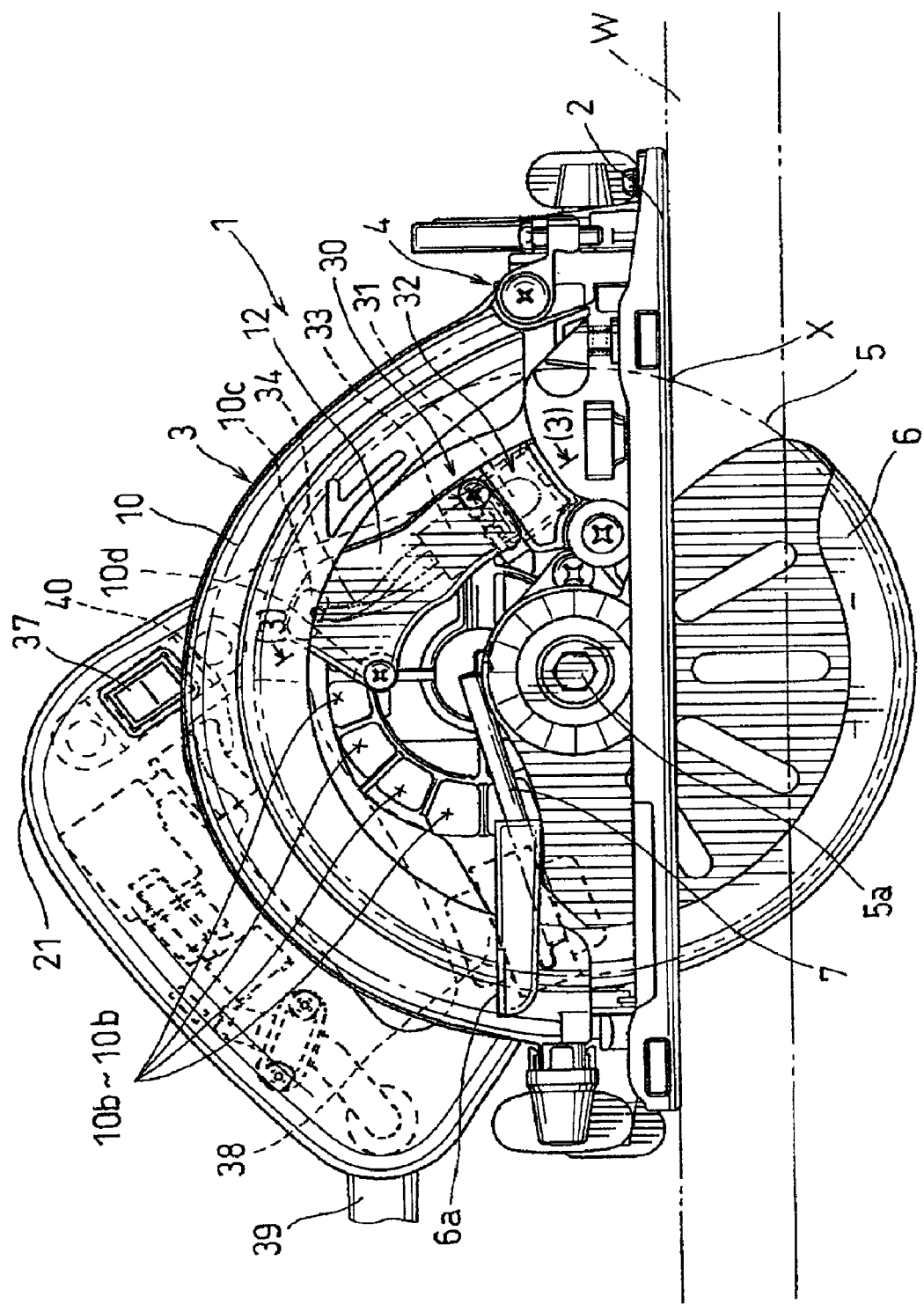
FIG. 1 is a side view of a representative portable saw.

Cutting tools are taught that include a saw blade and a blade case adapted to cover the saw blade. A light is preferably provided to illuminate a portion of the workpiece that will be cut by the saw blade during a cutting operation. In one preferred embodiment, the light is mounted within the blade case and is laterally displaced from the saw blade. The direction of the light is preferably substantially parallel to the cutting direction of the saw blade. A mounting device optionally may be disposed within the blade case in order to hold the light.

Because the light is disposed laterally from the cutting direction of the saw blade, a substantial volume of the cutting chips do not reach the light during the cutting operation. Therefore, the light can effectively illuminate the cut position, even after extended operation of the cutting tool. In addition, because the light is mounted within the blade case, the light can be positioned much closer to the cut position than the lights of known saws, in which the light is mounted on the motor housing that accommodates the motor for driving the saw blade. Further, the light is directed substantially in parallel to the cutting line. As a result, the lighting efficiency can be further improved over known saws.

The mounting device may be disposed on one side of the blade case and may laterally oppose the saw blade. With this arrangement, the mounting device and the light may be hidden from the outside by the blade case. More preferably, the mounting device and the light do not interfere with other parts of the cutting tool.

In another embodiment of the present teachings, the mounting device may include a cover member that can substantially shield the light from the saw blade. However, a gap or space is provided to permit light to reach the cut portion. Therefore, the light can be reliably protected against the cutting chips and the light can still effectively illuminate the cutting portion of the workpiece along the cutting direction of the cutting tool.

In another embodiment of the present teachings, the lighting direction may be substantially parallel to the saw blade. However, the lighting direction may be slightly inclined relative to the saw blade in order to directly illuminate along the direction of the cutting line.

In another embodiment, the light is preferably an incandescent light bulb or another electrically powered light source, such as a light emitting diode (LED). The cutting tool may further include a power supply circuit for supplying power to the light. The cover member may define a space for receiving the light and a portion of the power supply circuit.

The power supply circuit may include a socket and an electrical line extending from the socket. The socket may be coupled to the mounting device. Preferably, the socket and a portion of the electrical line are disposed within the space defined within the cover member.

Preferably, a cooling device, such as a fan, may be provided that serves to cool the light. Therefore, the light and the socket may be prevented from excessively heating. Therefore, the lighting efficiency can be maintained during long use.

In another embodiment of the present teachings, a cooling device, such as a fan, may be provided to produce a flow of air in order to cool the motor. The light cooling device and the motor cooling device may optionally be the same cooling device. In this case, at least one vent opening may be formed in the blade case and cooling air from the motor may flow through the opening into the blade case. The cover member may be configured such that the cooling air that flows through the vent opening preferably flows across the light so as to cool the light. Therefore, a separate fan or other device for producing a flow of air is not required to cool the light in this embodiment, because the cooling air from the motor also may be utilized to cool the light.

In another aspect of the present teachings, cutting tools are taught that include a saw blade, a blade case adapted to cover the saw blade, a motor housing adapted to accommodate a motor for driving the saw blade and a lighting device having an electrical light for illuminating a cut portion of a workpiece that is cut by the saw blade during a cutting operation. Preferably, a power supply circuit is provided to supply power to the light. The blade case and the motor housing may be formed separately from each other and may be adapted to be joined to each other along a joining line. The power supply circuit may have a first circuit portion on the side of the motor and disposed on the motor housing and a second circuit portion on the side of the light disposed on the blade case. A coupling may connect the first circuit portion and the second circuit portion. Therefore, the first circuit portion and the second circuit portion can be connected after (or at the same time that) the motor housing and the blade case are joined to each other. As a result, the power supply circuit can be easily wired and assembled.

In another embodiment of the present teachings, the coupling is operable to connect the first circuit portion and the second circuit portion from the outer side of the tool after the motor housing and the blade case have been joined to each other.

In another embodiment, a recess may be formed in an outer surface of the cutting tool and the recess may be adjacent to the joining line in order to accommodate the coupling. A coupling cover may cover the coupling from the outside when the coupling is accommodated within the recess. Therefore, the coupling cover protects the coupling from foreign particles.

In another optional embodiment, the coupling may serve to automatically connect the first and second circuit portions at the same time that the blade case and the motor housing are joined to each other. Therefore, the connecting operation can be easily quickly performed.

In another embodiment of the present teachings, the power supply circuit also supplies power to a motor for driving the saw blade. Therefore, the power supply circuit can be used to supply power to both the light and the motor. As a result, manufacturing costs can be reduced.

In another embodiment of the present teachings, the cutting tool may include a base adapted to be placed on a workpiece that will be cut. The cutting tool also may include a handle that is adapted to be held by an operator. The power supply circuit may include other circuit elements, such as a transformer, and the circuit elements may be positioned such that the cutting tool is balanced when the base extends substantially in a horizontal direction. For example, the cutting tool is preferably balanced when the cutting tool is held by the operator by means of the handle. Therefore, the cutting tool can be easily held during transportation of the cutting tool. Preferably, the transformer may be disposed substantially in a vertical plane that extends through the handle.

In another embodiment of the present teachings, a power switch and a lighting switch may be mounted on the handle and may be positioned adjacent to each other. The power switch and the lighting switch may be operable to start the motor and to turn on the light, respectively. Therefore, the operator can easily turn on the light either before or after starting the motor using the power switch.

In another aspect of the present teachings, circular saws are taught that include a base, a saw unit that can move vertically relative to the base and a circular saw that is rotatably driven by a motor. The saw unit may have a blade case adapted to cover the saw blade. The blade case may include at least one side portion that laterally opposes the saw blade.

A lighting device may optionally be provided and may include the light adapted to illuminate a portion of the workpiece that will be cut by the saw blade during a cutting operation. A mounting device optionally may serve to mount the light on the blade case, so that the light is laterally displaced. Therefore, the lighting device may effectively illuminate the cut portion of the workpiece during the cutting operation by the circular saw.

In another aspect of the present teachings, a method of illuminating a cut portion of a workpiece by a cutting tool is taught. The cutting tool may include a saw blade and a blade case adapted to cover the saw blade. The light is preferably mounted within the blade case in a position displaced laterally from the saw blade. The method may include shining the light in order to illuminate the cut portion of the work piece during the cutting operation.

The present cutting tools may operate using a commercial power supply, such as an alternating current of 100 volts, 115 volts or 220 volts. In the alternative, the cutting tools may be "cordless" and operate using a rechargeable battery, such as a nickel-cadmium or metal-hydride battery.

Each of the additional features and teachings disclosed above and below may be utilized separately or in conjunction with other features and teachings to provide improved cutting tools and methods for designing and using such cutting tools. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 2:
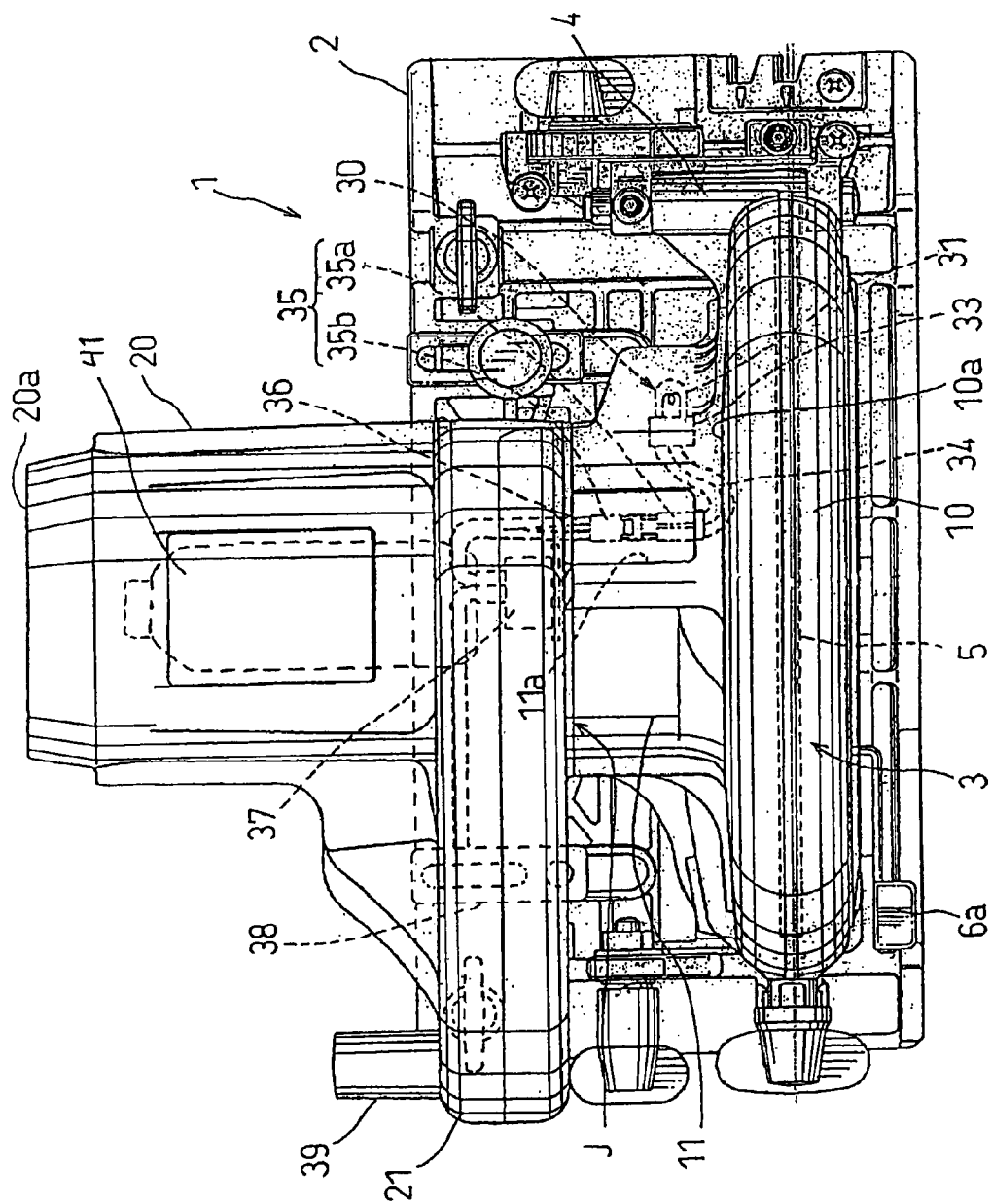
FIG. 2 is a plan view of the representative portable saw.

A detailed representative embodiment of a portable circular saw will now be described with reference to the drawings. Referring to FIGS. 1 and 2, a portable circular saw 1 is shown that may generally comprise a base 2 and a saw unit 3. The base 2 is preferably adapted to be placed on a workpiece W that will be cut. The saw unit 3 may be vertically pivotally mounted on the base 2 by means of a pivotal support mechanism 4. The saw unit 3 may have a blade case 10 that rotatably supports a circular saw blade 5.

The blade case 10 may cover the peripheral portion of substantially the upper half of the circular saw blade 5 from the outside in a radial direction and in an axial direction of the saw blade 5. The blade case 10 may include a cover portion 10a that serves to cover one lateral side of the saw blade 5 on the side of a motor housing 20. A substantially cylindrical gear housing 11 may be formed integrally with the cover portion 10a. The gear housing 11 and the motor housing 20 may be joined to each other along a joining plane J when the circular saw 1 is assembled.

A motor 41 is preferably disposed within the blade case 10. A reduction gear (not shown) may transmit the rotation of the motor 41 to the saw blade 5 and may be disposed within the gear housing 11. Thus, the motor 41 can rotate the saw blade 5 about a rotational shaft 5a.

A plurality of vent openings 10b may be formed in series in the cover portion 10a along the rotational direction of the motor. Therefore, cooling air will enter the blade case 10 after the cooling air has cooled the motor. A fan (not shown) may be mounted on an output shaft of the motor 41. Thus, the fan may force a flow of cooling air to enter the motor housing 20 from the outside through air inlets (not shown) formed in the rear cover 20a (see FIG. 2) of the motor housing 20. The cooling air may then flow through the motor housing 20 and through the gear housing 11 in order to cool the motor and may subsequently enter the blade case 10 through the vent openings 10b.

A safety cover 6 may be rotatably mounted on the rotational shaft 5a of the saw blade 5 and may be held in a position to cover substantially the lower half of the saw blade 5 by the biasing force of a spring 7. As shown in FIG. 1, the safety cover 6 may rotate in a clockwise direction to uncover the lower half of the saw blade 5 against the biasing force of a spring 7. Thus, in order to cut the workpiece W, the base 2 may be placed on the workpiece W and the saw unit 5 may then be moved along the workpiece W. At the same time, the front end of the safety cover 6 preferably contacts the end surface of the workpiece W. Therefore, as the saw unit 5 moves to cut the workpiece W, the safety cover 6 may rotate to uncover the saw blade 5. When the safety cover 6 is moved away from the workpiece W after the cutting operation, the safety cover 6 may automatically rotate in the counterclockwise direction, due to the biasing force of the spring 7, so as to return to the original position. However, the safety cover also may be manually rotated to uncover and cover the saw blade 5 by vertically moving a cover handle 6a.

Figure 3:
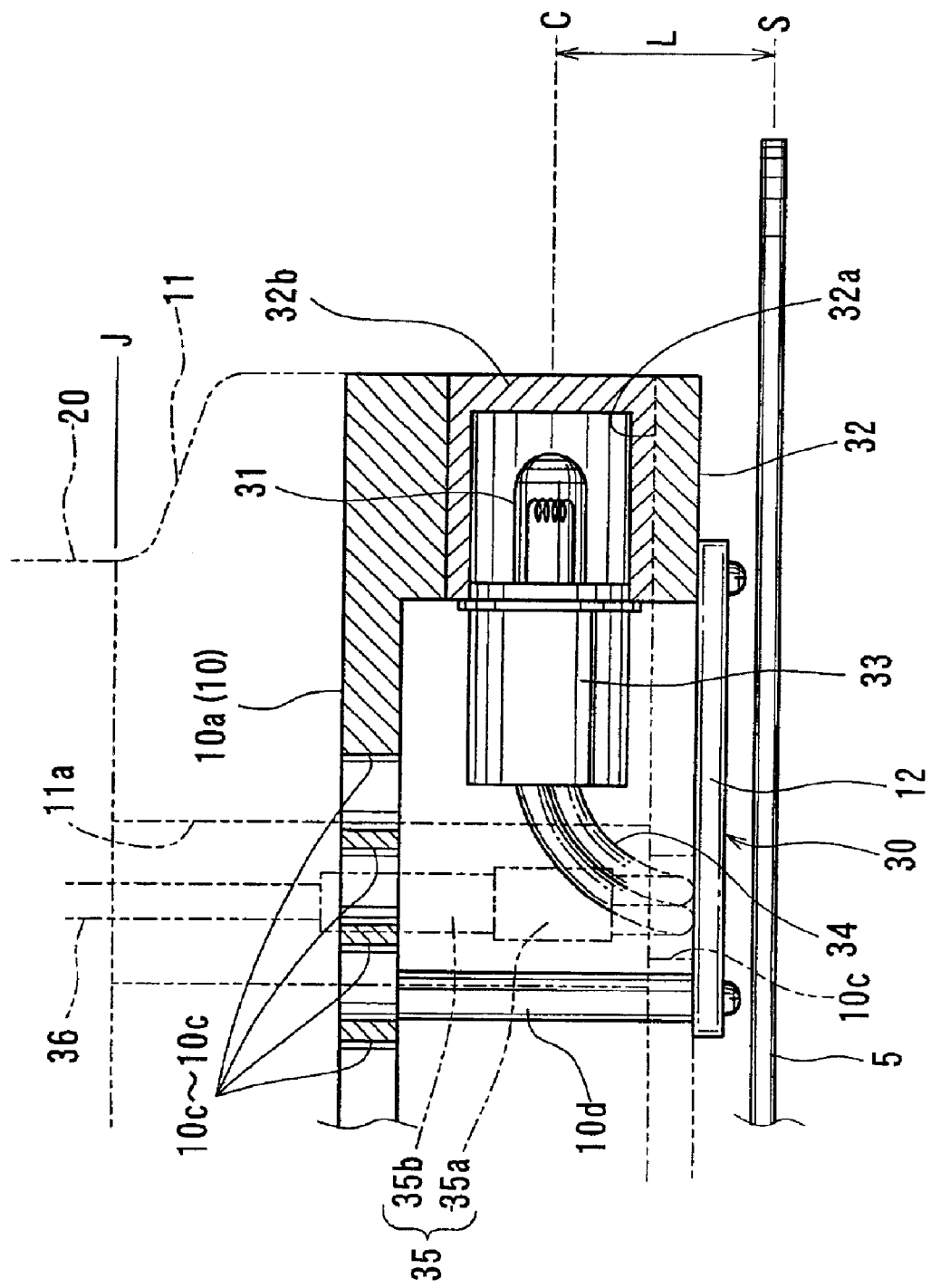
FIG. 3 is an enlarged sectional view taken along line (3)—(3) in FIG. 1.

A lighting device 30 may include an incandescent light bulb 31 mounted on a holder portion (mounting device) 32. As shown in FIG. 3, the holder portion 32 may be formed integrally with an inner surface of the cover portion 10a. Preferably, the light bulb 31 is disposed within the vicinity of cut point X on the upper surface of the workpiece W. More preferably, the light bulb 31 may positioned such that light from the light bulb 31 is directed toward the cut point X so as to illuminate the cut point X and the area around the cut point X. A support hole 32a may be formed through the holder portion 32 and may have a central axis C that is aligned with the central axis of the light bulb 31. In this representative embodiment, the central axis C extends substantially in parallel to the saw blade 5 and is directed toward the cut point X.

The light bulb 31 may be connected to a socket 33 that is detachably mounted to the holder portion 32. Preferably, the socket 33 may have engaging protrusions (not shown) at its front end (right side as viewed in FIG. 3). Further, lock recesses (not shown) may be formed around the rear opening of the support hole 32a in order to engage the engaging protrusions. The engaging protrusions may engage the lock recesses when the socket 32a is rotated by a predetermined angle with the front end of the socket 33 positioned within the opening of the support hole 32a. As a result, the socket 33 and the light bulb 31, which is connected to the socket 33, can be fixed in position relative to the holder portion 32.

Preferably, a transparent cap 32b may be mounted within a portion of the support hole 32a (the right side portion as viewed in FIG. 3) that is opposite to the cut point X. The transparent cap 32b may preferably prevent the cutting chips from entering the support hole 32a. However, light emitted from the light bulb 31 can pass through the transparent cap 32b to reach the cut point X. Therefore, the cutting chips do not directly adhere to the light bulb 31 and the light bulb 31 is prevented from suffering damage due to foreign particles, such as the cutting chips.

As shown in FIG. 3, the central axis C of the support hole, which axis C is aligned with the central axis of the light bulb 31, is displaced laterally (upward as viewed in FIG. 3) by a distance L from a central line S of the saw blade 5. Thus, the light bulb 31 is displaced laterally from the saw blade 5. During the cutting operation, although the cutting chips generally scatter substantially along the central line S, the range of scattering of the cutting chips generally increases as the distance from the cut point X increases. In this representative embodiment, the cutting chips do not substantially adhere to light bulb 31, because the light bulb 31 is positioned laterally of the saw blade 5. Because the central axis C of the light bulb 31 is substantially parallel to the saw blade 5, the central axis C is not directed toward the cut point X. However, because the distance L is relatively short, diffused light from the light bulb 31 can still reliably illuminate the cut point X. Of course, the central axis C may be slightly inclined relative to the saw blade 5 to be substantially directed toward cut point X.

In addition, in this representative embodiment, the light bulb 31 is disposed within the support hole 32a. The transparent cap 32b closes the lower end of the support hole 32a, which is opposite to the cut point X. Therefore, cutting chips that may fly up from the cut point X do not adhere to the light bulb 31. Consequently, the lighting efficiency of the light bulb 31 may be properly maintained, even if the portable saw 1 is used for a long time.

If a substantial amount of scattered cutting chips do not reach the light bulb 31, the distance L may be reduced so as to minimize the distance between the light bulb 31 and the cut point X. By reducing the distance L, the lighting efficiency will be further improved.

A support rod 10d may have one end that is secured to the inner surface of the cover portion 10a and may extend laterally toward the saw blade 5. As shown in FIG. 1, a shield plate 12 may extend obliquely upward from the holder portion 32 so as to cover the socket 33. Therefore, the cutting chips are prevented from adhering to the socket 33. An upper portion of the shield plate 12 may be secured to the other end of the support rod 10d. A lower portion of the shield plate 12 may be secured to the inner surface of the holder portion 32, which inner surface opposes the lateral surface of the saw blade 5. In addition, as shown in FIG. 1, the upper end of the shield plate 12 is positioned forwardly adjacent to the vent openings 10b in the circumferential direction of the cover portion 10a. Therefore, the air blown out of the vent openings 10b may enter the space between the shield plate 12 and the cover portion 10a so as to cool the socket 33 and the light bulb 31.

An electric wire or line 34 may extend from the rear end of the socket 33 and may enter the interior of the gear housing 11 through any one of openings 10c that are formed in the cover portion 10a of the blade case 5. As shown in FIG. 2, a recess 11a may be formed in an upper surface of the gear housing 11 in order to accommodate a coupling 35. The coupling 35 may include a female coupling member 35a and a male coupling member 35b that can be detachably connected to each other. The end portion of the electrical wire or line 34 of the side opposite to the socket 33 may enter the recess 11a through the wall of the gear housing 11 and may be connected to the female coupling member 35a. One end of an electric line 36 may be connected to the male coupling member 35b. The other end of the electric line 36 may be connected to a power supply (not shown), such a commercial AC (alternating current) 100 V, 115 V or 220 V power supply, via a light switch 37 and a transformer 38. Together, the electric wire 34, power supply and light switch 37 may form a power supply circuit. The coupling members 35a, 35b, and transformer 38 may optionally be included in the power supply circuit. Thus the commercial power supply voltage, e.g. AC 100 V may be reduced to a lower voltage, such as 12V, by the transformer 38 and may then be supplied to the light bulb 31 via the electric lines 36 and 34. The power supply circuit also may be connected to the motor so as to supply the reduced voltage to the motor. Naturally, if the power supply is, for example a rechargeable battery of 18 V or 24 V, the transformer 38 may be preferably eliminated.

As shown in FIGS. 1 and 2, a handle 21 may be mounted on the motor housing 20, so that the operator can carry the portable saw 1 and can perform a cutting operation while grasping the handle 21. Preferably, the handle 21 may have a substantially D-shaped configuration and may be inclined obliquely relative to the base 2. The light switch 37 may be mounted on one side of the upper front portion of the handle 21 and may be operable by an operator to turn on the light bulb 31. The transformer 38 may be disposed within the rear lowermost portion of the handle 21. The power supply circuit may be connected to an electric cord 39 that may extend from the rear end of the handle 21. The electric cord 39 may be adapted to be connected to a commercial outlet. In the alternative, a rechargeable battery pack (not shown) may be mounted on the handle, or another portion of the saw, and the electric cord 39 may be eliminated.

A power switch 40 may be mounted on the handle 21 on an upper side of an opening defined by the D-shape of the handle 21. Thus, the handle 21 can be grasped and the power switch 40 can be pulled or squeezed to start the motor while grasping the handle 21. Preferably, the light switch 37 may be disposed adjacent to the power switch 40, so that the operator also can operate the light switch 37 while grasping the handle 21.

As noted previously, the transformer 38 may be disposed within the rear lowermost portion of the handle 21. In particular, the position of the transformer 38 may be chosen such that the transformer 38 may serve as a counterweight to the weight of the motor and/or other parts of the portable saw 1. Thus, portable saw 1 may be horizontally balanced state, which will simplify transportation. More specifically, in the horizontally balanced state, the base 2 may extend in a substantially horizontal direction when the handle 21 of the portable saw 1 is held.

As described above, according to the representative portable saw 1, the central axis C of the support hole 32a, which is also the central axis of the light bulb 31 of the lighting device 30, is displaced laterally from the central line S of the saw blade 5. Therefore, the substantial volume of the scattered cutting chips do not reach the light bulb 31 during the cutting operation. As a result, the operator can perform the cutting operation and can reliably inspect the cut point X or the area around the cut point X, even if the portable saw 1 is used for a long time.

In addition, because the electric line 34 on the side of the light bulb 31 and the electric line 36 on the side of the motor can be connected by the coupling 35 in a position adjacent to the joining surface J between the gear housing 11 and the motor housing 20, the electric lines 34 and 36 can be easily wired. Thus, prior to joining the gear housing 11 and the motor housing 20, the electric line 34 may be wired to the gear housing 11 and to the blade case 10 that is formed with the gear housing 11. In addition, the socket 33 and the holder portion 32 also may be easily assembled. In the alternative, the electric line 36 can be wired to the motor housing 20 independently of wiring the electric line 34. After joining the gear housing 11 and the motor housing 20, the electric lines 34 and 36 may be connected to each other by the coupling 35, which may substantially simplify the entire wiring operation as well as the assembling operation of the portable saw 1.

Further, because the air blown out of the vent openings 10b may be utilized to cool the socket 33 and the light bulb 31, the light bulb 31 and the socket 33 may be prevented from excessively heating during operation of the portable saw 1. Therefore, the lighting device 30 also may have an improved durability as a result of this optional feature.

Moreover, the transformer 38 may serve as a counterweight for balancing the portable saw 1 in the horizontal state during the transportation of the portable saw 1. Thus, the portable saw 1 may be easily and comfortably transported.

The above representative embodiment may be modified in various ways. For example, although the female coupling member 35a and the male coupling member 35b of the coupling 35 are not attached to the gear housing 11 in the representative embodiment, the female coupling member 35a and the male coupling member 35b may be secured to the gear housing 11 and the motor housing 20, respectively, at positions adjacent to the joining surface J. For example, the female coupling member 35a can be connected to the male coupling member 35b at the same time that the gear housing 11 and the motor housing 20 are joined to each other. Therefore, the female coupling member 35a and the male coupling member 35b can be connected simultaneously with joining the gear housing 11 and the motor housing 20. As a result, the assembling operation of the portable saw 1 may be further simplified.

Although the present invention has been described with reference to the representative portable saw 1, the present invention may be applied to any kind of cutting tools, such as table saws or miter saws having a table on which workpieces are placed, and reciprocating cutting tools including jig saws and reciprocating saws.

Additional lighting techniques for cordless power tools are taught in U.S. patent application Nos. 09/605,517 and 09/628,928, which are commonly owned and are both incorporated herein by reference in their entirety.

What is claimed is:

1. A cutting tool, comprising:
a saw blade,
a blade case comprising a blade cover adapted to substantially cover at least one lateral side of the saw blade and
a light disposed within the blade case, wherein the light is displaced from the saw blade in a lateral direction that is substantially perpendicular to a face of the saw blade, the light is substantially aligned with a cutting line of a workpiece that will be cut by the saw blade during a cutting operation, and
wherein the blade cover includes an inner wall and the light is mounted to a part of the inner wall that opposes to the saw blade in the lateral direction, and
wherein the cutting tool is a portable circular saw, the saw blade is a circular saw blade and the light is laterally displaced from the circular saw blade along the rotational axis of the circular saw blade, wherein the lighting direction is substantially parallel to the saw blade, the cutting tool further comprising:
a base adapted to contact the workpiece during the cutting operation,
a mounting device constructed to receive the light,
a saw unit arranged and constructed to vertically pivot relative to the base, wherein the blade case is a portion of the saw unit, the blade case comprises a side portion that laterally opposes the circular saw blade and the light and the mounting device are disposed within the side portion,
a handle coupled to the saw unit,
a cover member disposed to substantially protect the light from the saw blade, wherein a gap is maintained to permit light to be directed to the portion of the workpiece that will be cut,
a power supply circuit adapted to supply power to a motor and to the light, wherein elements of the power supply circuit are arranged to horizontally balance the cutting tool when the base extends substantially in a horizontal direction and the cutting tool is held by the handle, wherein the power supply circuit comprises a transformer that is disposed substantially in a vertical plane that extends through the handle and a socket and an electrical line extending from the socket, the socket being coupled to the mounting device, wherein the socket and a portion of the electrical line are disposed within a space defined within the cover member,
a power switch mounted on the handle and operable to start the motor and
a lighting switch mounted on the handle and being positioned adjacent to the power switch, the lighting switch being operable to turn on the light.

2. A cutting tool as in claim 1, further including a cooling device adapted to cool the light during operation and to produce a flow of air to cool the motor, wherein at least one vent opening is formed in the blade case, cooling air is directed to flow into the blade case through the at least one vent opening and the cover member is arranged and configured to direct cooling air from the vent opening to flow across the light so as to coal the light.

3. A cutting tool as in claim 2, wherein the power supply circuit comprises:
a motor housing accommodating a motor for driving the saw blade, wherein the blade case and the motor housing are formed separately from each other and are joined to each other along a joining line, a first circuit portion disposed within the motor housing and a second circuit portion disposed within the blade case, and a coupling connecting the first circuit portion and the second circuit portion, wherein the coupling is arranged and constructed to connect the first circuit portion and the second circuit portion from the outer side of the tool after the motor housing has been joined to the blade case.

4. A cutting tool comprising:

a saw blade, a blade case comprising a blade cover adapted to substantially cover at least one lateral side of the saw blade, a motor housing adapted to accommodate a motor for driving the saw blade, wherein the blade case and the motor housing are formed separately from each other and are adapted to be joined to each other along a joining line, a light adapted to illuminate a portion of a workpiece that will be cut by the saw blade during a cutting operation, wherein the light is laterally displaced from the saw blade and the light is substantially aligned with a cutting line of a workoiece that will be cut by the saw blade during a cutting operation, and wherein the blade cover includes an inner wall and the light is mounted to a part of the inner wall that opposes to the saw blade in the lateral direction, a power supply circuit adapted to supply power to the light, wherein the power supply circuit comprises a first circuit portion disposed within the motor housing and a second circuit portion disposed within the blade case and a coupling connecting the first circuit portion and the second circuit portion, wherein the coupling is operable to connect the first circuit portion and the second circuit portion from an outer side of the tool after the motor housing and the blade case have been joined to each other.

5. A cutting tool as in claim 4, further comprising:

a recess formed in an outer surface of the cutting tool adjacent to the joining line that accommodates the coupling and a coupling cover that covers the coupling from an outside when the coupling is accommodated within the recess.

* * * * *